United States Patent
Krause et al.

[19]

[11] Patent Number: 5,923,466
[45] Date of Patent: *Jul. 13, 1999

[54] LIGHT MODULATED CONFOCAL OPTICAL INSTRUMENTS AND METHOD

[75] Inventors: Andrew W. Krause, Sparks, Md.; Minhua Liang, Woodbury, Minn.; Robert L. Stehr, Gaithersburg, Md.

[73] Assignee: Biophysica Technologies, Inc., Baltimore, Md.

[ * ] Notice: This patent is subject to a terminal disclaimer.

[21] Appl. No.: 08/770,423

[22] Filed: Dec. 20, 1996

Related U.S. Application Data

[63] Continuation-in-part of application No. 08/138,067, Oct. 20, 1991., Pat. No. 5,587,832

[51] Int. Cl.$^6$ .................................................. G02B 21/06
[52] U.S. Cl. .......................... 359/389; 359/216; 359/385
[58] Field of Search .................................. 359/225–236, 359/368–272, 385–389, 591–592, 838–839, 846–855

[56] References Cited

U.S. PATENT DOCUMENTS

| | | | |
|---|---|---|---|
| 3,013,467 | 12/1961 | Minsky | 356/432 |
| 3,926,500 | 12/1975 | Frosch et al. | 359/235 |
| 4,198,571 | 4/1980 | Sheppard | 250/571 |
| 4,561,731 | 12/1985 | Kley | 359/36 |
| 4,601,537 | 7/1986 | Saccocio | 359/117 |
| 4,634,880 | 1/1987 | Lindow et al. | 250/566 |
| 4,699,498 | 10/1987 | Naemura et al. | 346/160 |
| 4,802,748 | 2/1989 | McCarthy et al. | 359/368 |
| 4,806,004 | 2/1989 | Wayland | 359/385 |
| 4,863,226 | 9/1989 | Houpt et al. | 359/212 |
| 5,032,720 | 7/1991 | White | 250/236 |
| 5,035,476 | 7/1991 | Ellis et al. | 359/202 |
| 5,065,008 | 11/1991 | Hakamata et al. | 359/385 |
| 5,067,805 | 11/1991 | Corle et al. | 359/235 |
| 5,081,349 | 1/1992 | Iwasaki | 359/368 |
| 5,099,363 | 3/1992 | Lichtman | 359/368 |
| 5,122,653 | 6/1992 | Ohki | 250/216 |
| 5,132,526 | 7/1992 | Iwasaki | 250/201.3 |
| 5,138,459 | 8/1992 | Roberts et al. | 358/209 |
| 5,144,477 | 9/1992 | White | 359/368 |
| 5,162,941 | 11/1992 | Favro et al. | 359/368 |
| 5,239,178 | 8/1993 | Derndinger et al. | 359/397 |
| 5,260,826 | 11/1993 | Wu | 359/368 |
| 5,295,017 | 3/1994 | Brown | 359/389 |
| 5,452,125 | 9/1995 | White et al. | 359/385 |
| 5,587,832 | 12/1996 | Krause | 359/385 |
| 5,659,420 | 8/1997 | Wakai et al. | 359/385 |
| 5,696,616 | 12/1997 | Wagensonner | 359/201 |

OTHER PUBLICATIONS

"Active–pixel sensors challenge CCDs", *Technology Guide Detector Handbook*, by Eric R. Fossum, Laser Focus World, Jun. 1993, pp. 83–87.

"An Overview of Texas Instruments Digital Micromirror Device (DMD) and its Application to Projection Displays", by J.B. Sampsell, Texas Instruments Incorporated, Dallas, Texas.

*Primary Examiner*—Thong Nguyen
*Attorney, Agent, or Firm*—Sixbey, Friedman, Leedom & Ferguson; Daniel W. Sixbey

[57] ABSTRACT

The confocal imaging system and method involve the imaging of a specimen under observation by projecting a light pattern of illumination spots simultaneously on the specimen. This is accomplished by a pattern array unit which transforms light from a light source into a desired pattern of illumination spots, and reflects or rejects light outside the pattern. Light detected from the specimen is confined to a pattern conforming to the pattern of the illumination spots by the same pattern array unit which rejects light beyond the pattern, and rejected light from the pattern array unit is transmitted back to the light source. Image signals are created from the received light and stored, and the stored image signals are combined to form a complete image frame.

19 Claims, 7 Drawing Sheets

LIGHT MODULATED CONFOCAL OPTICAL INSTRUMENTS AND METHOD

This application is a continuation-in-part application of U.S. application Ser. No. 08/138,067, field Oct. 20, 1993, now U.S. Pat. No. 5,587,832.

TECHNICAL FIELD

This invention relates generally to optical instrumentation and more particularly to spatially modulated light optical instruments and a method which employ multiple pattern illumination.

BACKGROUND ART

The basic principle that distinguishes a confocal microscope from other forms of light microscopy is that discrete aperture spots are illuminated in the object plane of the microscope from which reflected or fluorescent light is then relayed for observation through conjugate apertures in the image plane. For diffraction limited spots, this principle results in spacial resolution 1.4 times better than the optimum resolution obtainable by conventional light microscopy. Furthermore, this method dramatically reduces the interference of stray, out-of-focus light from an observed specimen above or below the focal plane. This technique actually permits optical sectioning of living tissue (with depth restrictions) and high-resolution 3-D reconstruction with automated focussing controls. It is the only microscopic technique that can effectively resolve individual cells in living tissue without staining.

Presently known confocal microscopes employ a sequential scanning technique which involves scanning each illumination and image conjugate aperture pair one at a time until the object (and image) has been covered sufficiently to produce an adequate confocal image. A basic form of the confocal microscope is disclosed in U.S. Pat. No. 3,013,467 to Minsky.

Scanning technologies which have been developed for known confocal microscopes include the mechanical translation of the specimen with fixed optics, but scanning has also been accomplished using a fixed specimen and scanning beams manipulated by special rotating aperture disks. The use of such rotating disks is disclosed in U.S. Pat. Nos. 4,802,748 to McCarthy et al., 5,067,805 to Corle et al., 5,099,363 to Lichtman and 5,162,941 to Favro et al. Although these disks include a plurality of apertures, only one aperture at a time is used for scanning. Other known confocal scanning systems have included a laser beam rastered with rotating mirrors to scan a specimen, or a laser beam which scans a slit rather than a spot. Such slit scanning increases imaging speed but slightly degrades resolution.

Conventional confocal microscopes are subject to a number of limitations imposed by the scanning techniques employed. In some cases, confocal image acquisition is too slow for certain applications and becomes slower as the scan line density decreases and as aperture separation increases. Furthermore, these parameters are preset and are not practically adjustable in most commercial systems. Signal-to-noise ratio (SNR) must be severely sacrificed to increase imaging rate. Trying to improve SNR by increasing illumination intensity is often limited by the susceptibility of live cells to photodamage or rapid fluorophore photobleaching.

For most conventional confocal systems, proper alignment is critical and may be difficult to maintain. The same physical aperture must be used for illumination and detection thereby limiting this technique to the study of reflection and epifluorescence. Therefore, transmitted light confocal imaging through a translucent slice (as for many voltage-sensitive dyes) is not practically possible.

Finally, it is often difficult or impossible for the user to restrict illumination and imaging to any selected subfield and differentially control light exposure.

Laser scanning systems have become widely accepted because of their higher intensity and diffraction limited spot size which results in greater resolution in the confocal image. However, they are more expensive than white-light systems and do not offer the selection of illumination wavelengths needed for the growing varieties of fluorescence indicators now available. Furthermore, laser intensity often leads to problems with phototoxicity and rapid photobleaching.

Confocal imaging as now known has several significant physical constraints. Because only a small portion (e.g. 1%) of light from a light source is actually used for imaging, light efficiency is challenged in multiple point source scanning confocal imaging. The requirement of a high power light source to compensate for the low light efficiency in confocal imaging results in the generation of heat necessitating the use of cooling fans in light modules which generate harmful vibration.

There exist many fluorescent indicators which operate in the dual excitation, single emission ratio mode; for example, Fura-2 and BTC for calcium and BCECF for pH. Dual excitation indicators have proven to be problematic in ratio imaging microscopy because the two images acquired with different excitation wavelengths can never be obtained simultaneously. Reliable ratio imaging requires that the temporal separation of the two images be minimized relative to the rate of change of the ligand species which binds to the fluorescent indicator. Products for switching between two excitation sources include filter wheels and other mechanical devices (shutters, oscillating filters, etc.) and acousto-optics modulators or tunable filters. Mechanical devices are slow and may introduce vibrations which are detrimental to imaging. Although acousto-opticals are fast, solid state devices, they are extremely inefficient since they operate as diffraction gratings; only a small fraction of the incident light is available for excitation.

The fundamental limitation for image acquisition speed is the number of fluorescent photons detected. Rapid switching between two excitation sources at speeds greater than that required to produce the number of fluorescence photons needed for a given signal to noise figure of merit is not useful. Many of the fluorescent indicators have different overall fluorescence efficiencies for the ligand bound and free indicator compound. Thus there is a need for the ability to maximize the signal to noise properties of ratio imaging by providing variable dwell time for the bound and free indicator compound. Then the total number of photons needed for a given signal to noise figure of merit can be achieved with both images used to form the ratio by compensating for differing fluorescence efficiencies with variable excitation exposure times.

SUMMARY OF THE INVENTION

It is a primary object of the present invention to provide a novel and improved spatially light modulated confocal optical instrument which employs multiple pattern illumination to provide conjugate aperture patterns in the image plane.

A further object of the present invention is to provide a novel and improved method for confocal microscopy which includes creating a plurality of complementary patterns of illumination spots and superimposing these patterns sequentially on a specimen.

Yet another object of the present invention is to provide a novel and improved confocal light modulation system which can be conveniently combined with almost any conventional research microscope to convert the research microscope to a confocal microscope having unique capabilities.

A further object of the present invention is to provide a novel and improved spatially light modulated confocal microscope designed to image illuminate selected subsets of an entire cell field thereby enhancing image rate, signal-to-noise ratio, and light collection. The device will include user selectable program modules so that a user can fully control the optical transfer function of the confocal microscope in coordination with particular optical characteristics of a specimen.

Still another object of the present invention is to provide a novel and improved spatially light modulated confocal microscope wherein selected image subsets and entire field-by-field image acquisition can be completely controlled by an image processing system.

Yet another object of the present invention is to provide a novel and improved spatially light modulated confocal microscope which provides external gating and control of illumination and image acquisition giving the user the selection of illumination and imaging from partial view fields. White light, other non-coherent light sources or laser illumination may be selected and variable speed imaging is provided. Also, a choice may be made of reflection, fluorescence or transmission confocal imaging.

A further object of the present invention is to provide a novel and improved spatially light modulated confocal microscope which provides confocal illumination and imaging from user selected pixel aperture sizes, shapes and patterns which form complementary patterns to sample the whole object plane.

Another object of the present invention is to provide a novel and improved spatially light modulated confocal microscope adapted for software-mediated tuning of the microscope optical transfer function to optical specimen characteristics to provide novel forms of contrast enhancement.

Yet a further object of the present invention is to provide a novel and improved spatially light modulated confocal optical instrument wherein collimated light is patterned through a pixel shutter array having a high pixel density with patterned gating ability to achieve multiple pattern illumination of a specimen.

Another object of the present invention is to provide a novel and improved spatially light modulated optical instrument which employs pattern illumination to provide real time aberration testing for an optical components.

Yet another object of the present invention is to provide a novel and improved spatially light modulated optical instrument which provides rapid switching between a plurality of light sources with controlled photolysis and pattern generation and controlled field illumination.

A further object of the present invention is to provide a novel and improved spatially localized illumination system for switching between two illumination light sources to implement fluorescence ratio imaging with acquisition rates independent of the illumination switching time.

Another object of the present invention is to provide a novel and improved spatially light modulated confocal optical instrument including a light source module and a confocal module with light coupling therebetween formed by a single mode optical fiber or optical fiber bundles.

Yet a further object of the present invention is to provide a novel and improved spatially light modulated confocal optical instrument wherein defracted light not used for imaging from a pixel shutter array is recycled back to a system light source to enhance light source efficiency and reduce heat dissipation at the light source.

A still further object of the present invention is to provide a novel and improved spatially light modulated optical instrument using only a single digital micro-mirror device.

These and other objects of the invention are achieved by providing optics to direct light from a light source along an optical path to a specimen. A pattern array unit is positioned in the optical path between the light source and the specimen to transform light from the light source into a plurality of simultaneously formed illumination spots arranged in a pattern while deflecting light outside of the pattern. The optics image the pattern of illumination spots on a specimen and, in some embodiments, transmit the pattern of illumination spots on the specimen back along the optical path to an image detector. The pattern array unit, in this embodiment, operates to mask the image detector to cause the image detector to receive a light image in a pattern corresponding to the pattern of illumination spots. A light collector assembly is mounted to receive light deflected by the pattern array unit and to transmit light back to the light source.

BEST MODE FOR CARRYING OUT THE INVENTION

Ordinary light microscopes are often not adequate for the examination of biological specimens which are generally three-dimensional, for the two-dimensional image of the standard microscope is a superposition of the in-focus and out-of-focus regions of an observed specimen. Therefore, confocal microscopy was developed where the specimen is illuminated in a very small area one point at a time and a detector receives light only from the illuminated point. The image of the whole sample is obtained by scanning point to point over the sample and then reconstructing the total image.

Figure 1:
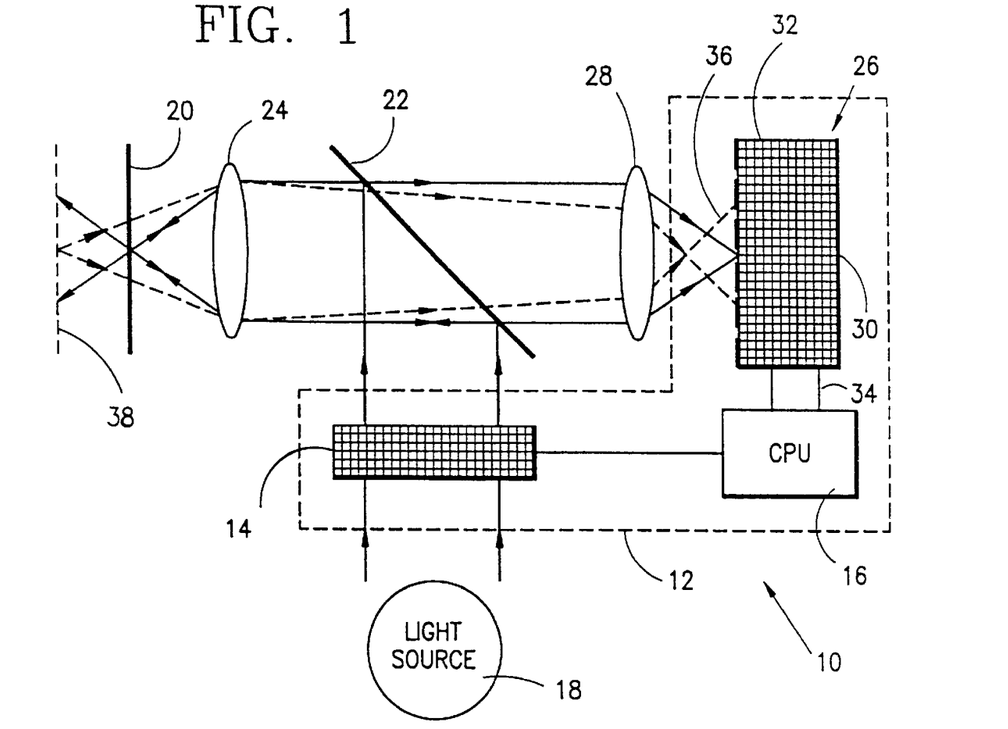
FIG. 1 is a basic optical schematic of a spatially light modulated confocal microscope embodying the present invention.

Referring now to FIG. 1, the spatially light modulated confocal microscope of the present invention indicated generally at 10 is schematically illustrated. In this device, the sequential spot scanning of conventional confocal microscopes is replaced by multiple pattern illumination (MPI), and the single channel detector, usually a photomultiplier tube, used with conventional sequential spot scanning is replaced by a two dimensional detector array masked by a conjugate aperture pattern which conforms with the multiple pattern illumination. Sequential complimentary patterns of illumination spots are imaged on an object.

A confocal light modulation system 12, which forms the basic component of the spatially modulated confocal microscope 10, may be combined with the basic optics present in most conventional research microscopes to convert the research microscope to a confocal microscope. This confocal light modulation system includes a multiple pattern aperture array 14 which operates under the control of a central processor unit 16 to transform illuminated light from a light source 18 into sequential complimentary patterns of illumination spots which are imaged on a specimen 20 by means of a dichroic beam splitter 22 and a microscope objective lens 24. In the image plane, a conjugate array detector system 26 detects the light from the illuminated spots on the specimen which are transmitted via the beam splitter 22 and a lens or mirror 28. This array detector system includes a two-dimensional detector 30 which is masked by a conjugate aperture pattern unit 32 controlled by the central processor 16. The conjugate aperture pattern unit can be a separate unit or can constitute an addressed masking section of the detector 30. Under the control of the central processor, the conjugate aperture pattern unit masks the detector to define a conjugate aperture image corresponding to the pattern of the illuminated spots on the specimen onto the detector 30 in synchrony with the corresponding complimentary pattern formed by the multiple pattern aperture array 14. Both the conjugate aperture pattern unit and the multiple pattern aperture array and preferably high speed, pixelated arrays having a high pixel density which provide patterns of very small spots.

The detector provides a video image output over lines 34 to the central processor unit which provides video image processing and display, or the detector could provide an output to a conventional video image processing and display system of known type.

To elaborate furthers using the method and apparatus of the present invention, sequential complimentary patterns of illumination spots are imaged on the specimen 20. Each full complimentary set of patterns will illuminate an entire object field without voids. The corresponding conjugate aperture patterns formed in front of a two dimensional detector modulate the image and reject stray out-of-focus light indicated in broken lines at 36, in FIG. 1 from out-of-focus planes indicated by plane 38. This process can yield one complete image of the entire object field after the storage and subsequent summing of the conjugate aperture patterns imaged on the detector 30.

Figure 2:
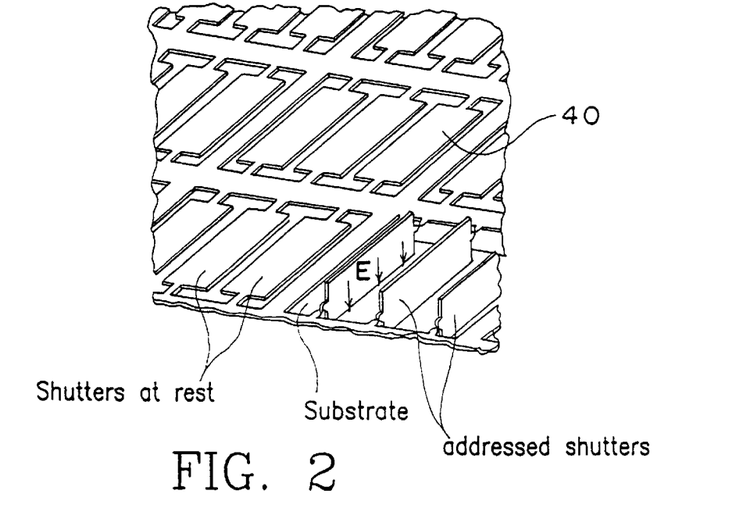
FIG. 2 is a perspective view of a portion of an electrostatic shutter array for use with the confocal microscope of FIG. 1.

The multiple pattern aperture array 14 can take two forms; namely, interference patterns or patterned throughput from an aperture pattern. Interference patterns are complex and difficult to control, and interference pattern integrity will be compromised by the differences in refraction and birefringence across specimens of living tissue. Therefore, a multiple pattern aperture array 14 which provides direct aperture throughput is preferred for its simplicity, versatility and ease of implementation. Such a multiple pattern aperture array can be formed by an array of ferroelectric liquid crystal devices, by a digital mirror device, or by electrostatic microshutters of the type illustrated at 40 in FIG. 2. At rest, the microshutters block light from the light source 18, but when selected shutters are gated from the central processor 16, they open as illustrated at E in FIG. 2 and pass light through to the specimen 20. Electronically addressed and gated microshutter arrays of the type shown in FIG. 2 are well known and have previously been employed in display devices. (See R. Vuelleumier, A-E Perret, F. Jurrez and P. Weiss (1984), Novel electromechanical microshutter display device. Proc. Eurodisplay '84, Display Research Conference Sept. SID).

Confocal imaging is possible by using two separate throughput aperture arrays operated in synchrony for the multiple pattern aperture array 14 and the conjugate aperture pattern unit 32. However, this requires extremely careful optical alignment and timing to implement. A simpler alternative is to employ an optical configuration that avoids use of two synchronously timed aperture arrays. This could be achieved by passing the image from the specimen back to the detector through the same aperture array used to form the multiple pattern aperture array 14, thus using this single array in place of the conjugate aperture pattern unit 32. For this purpose, the multiple pattern aperture array 14 would be positioned between the beam splitter 22 and the lens 24 in FIG. 1. However, this alternative requires precise optical alignment and would not provide a unit which could be easily attached to most conventional research microscopes.

The conjugate aperture pattern unit 32 and detector 30 may be advantageously formed electronically by a CID camera or a charge-coupled device detector array (CCD) which uses computer aided image processing to enable the detector to disregard light returns from detector pixels which are not activated. A charge-coupled detector has the ability to acquire an entire image at once rather than by raster scanning. A complete bit map must be constructed of where active pixels are located on the CCD after calibration for each aperture pattern to be provided by the multiple pattern aperture array 14 under the control of the central processing unit 16. Calibration simply requires training the processing unit 16 which controls the CCD to disregard pixels which should not be read by placement of a mirror in the objective focal plane of the microscope so that each illumination pattern from the multiple pattern aperture array can be imaged directly on the CCD and stored by the central processing unit. Additional electronic and computer aided filtering after calibration may be required to clarify aperture boundaries and improve spatial resolution and sectioning capability, but once this is done, only light transmitted to the CCD for an associated pattern from the multiple pattern aperture array 14 is imaged, while light spillage to other areas of the CCD is ignored and effectively masked. This technique provides practical transmission confocal microscopy because the illumination subsystem does not use the same optical path as the imaging subsystem as is evident from FIG. 1.

For a CCD unit to work at the high speeds desired for confocal microscopy, the detector pixel registers for the CCD device must be read rapidly in parallel for all lines.

Therefore, special CCD pixel driver circuitry is required to optimize the detector for high speed applications.

The need for the special driver circuitry required with a CCD detector to read lines in parallel can be eliminated by forming the detector 30 from an active pixel sensor (APS) rather than from a CCD. The active pixel sensor operates in a manner similar to that of a random access memory with each pixel containing its own selection and readout transistors. These transistors are monolithically integrated in the pixel for readout selection and amplifying or buffering the pixel output signal. An APS pixel pattern selected by the central processor 16 receives the light pattern from the specimen 20 and a photogenerated charge is integrated in each active pixel under a photogate. The selected pixels can be addressed simultaneously to provide output signals to an image processing system or to the central processing unit 16 for image processing.

The multiple pattern aperture array 14 and, for some applications, the conjugate aperture pattern unit 32 may preferably be formed by a digital micro-mirror device of a type developed by Texas Instruments Inc. of Dallas, Tex., which includes a monolithic electrostatic, mirror-coated shutter array. These pixelated, micro-mechanical spatial light modulators are formed monolithically upon a silicon chip and include minor squares of highly reflective material suspended above the surface of silicon addressing circuitry by support pillar torsion bars. The addressing circuitry under each mirror pixel is a memory cell accessed by the central processor unit 16 which drives two electrodes under each mirror with complimentary signals. When a high logical level is applied to one of the electrodes, the mirror pixel rotates in a given direction with a total deflection of about 20° between two mirror states, 10° on either side of the perpendicular to the silicon wafer.

Figure 3:
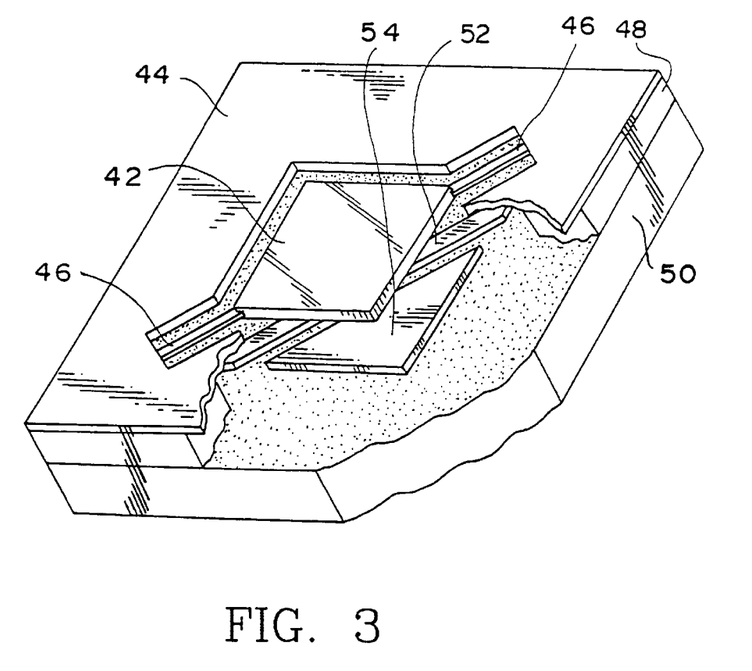
FIG. 3 is a cutaway view of a single pixel for a digital mirror device array used for the present invention.
Figure 4:
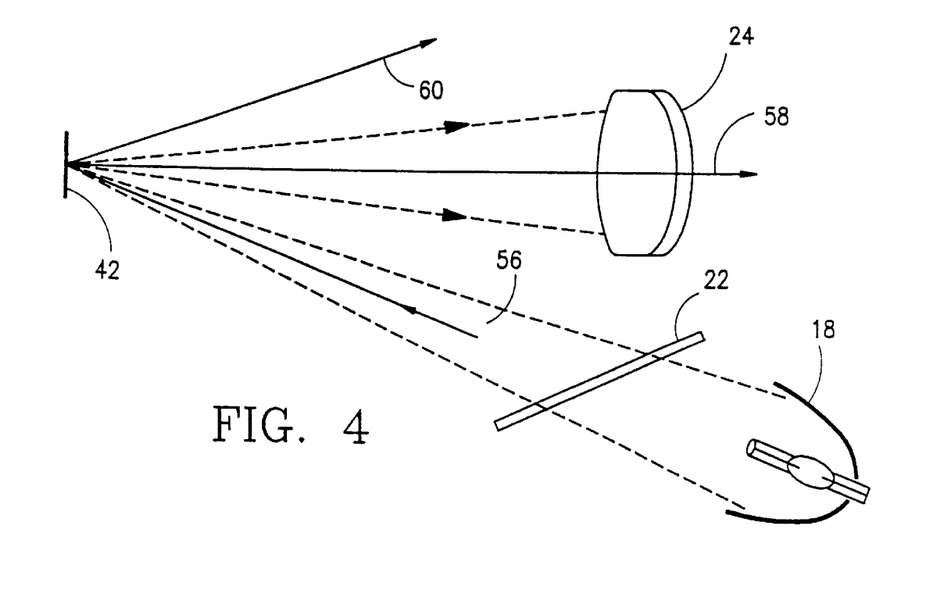
FIG. 4 is an optical diagram illustrating the operation of a digital mirror device with the present invention.

FIG. 3 illustrates the basic structure of one pixel for a digital mirror device array. Here, a mirror coated shutter 42 is mounted in contact with a conducting support layer 44 by torsion hinges 46. A spacer layer 48 separates the support layer 44 from a silicon chip 50. Each pixel of the digital mirror device array includes an address electrode 52 and a control or landing electrode 54 which, when activated, deflects the mirror coated shutter 42 around the torsion hinges 46. When the mirror coated shutter 42 forms part of a multiple pattern aperture array mounted in the optical path of the illumination subsection 56 for a microscope, it may be positioned in a first position as shown in FIG. 4 to direct a pixel of light along an optical path 58 to a specimen under observation. However, when the mirror coated shutter 42 is deflected from the position of FIG. 4, the pixel of light is angled away from the specimen along an optical path 60.

Software for the central processor unit 16 will enable a pre-programmed selection of any possible two dimensional pixel pattern within predetermined limits for confocal imaging. This technology provides the user with the flexibility to choose the pattern which offers the best combination of temporal and spacial resolution for a given application. The ability to custom make patterns can be geared for the correction of field distortion. The individual complementary images formed from each pixel pattern received by the detector 30 will be stored in the central processor unit 16 and subsequently overlaid to form one complete image frame for real-time imaging.

The control software for the central processor 16 will be programmed to select stored aperture patterns designated by the user and, for some applications, to automatically select stored aperture patterns in response to sensed conditions such as the optical characteristics of a specimen. The processor software may also cause the processor to make a specimen-dependent background correction for each image frame. This is accomplished by sensing with the detector 30 a background image which may result with all illumination pixels of the multiple pattern aperture array 14 closed to block light from the light source 18, and then correcting in the processor the subsequent individual complimentary images formed from each pixel pattern by subtracting therefrom the effect created by the background image.

Figure 5:
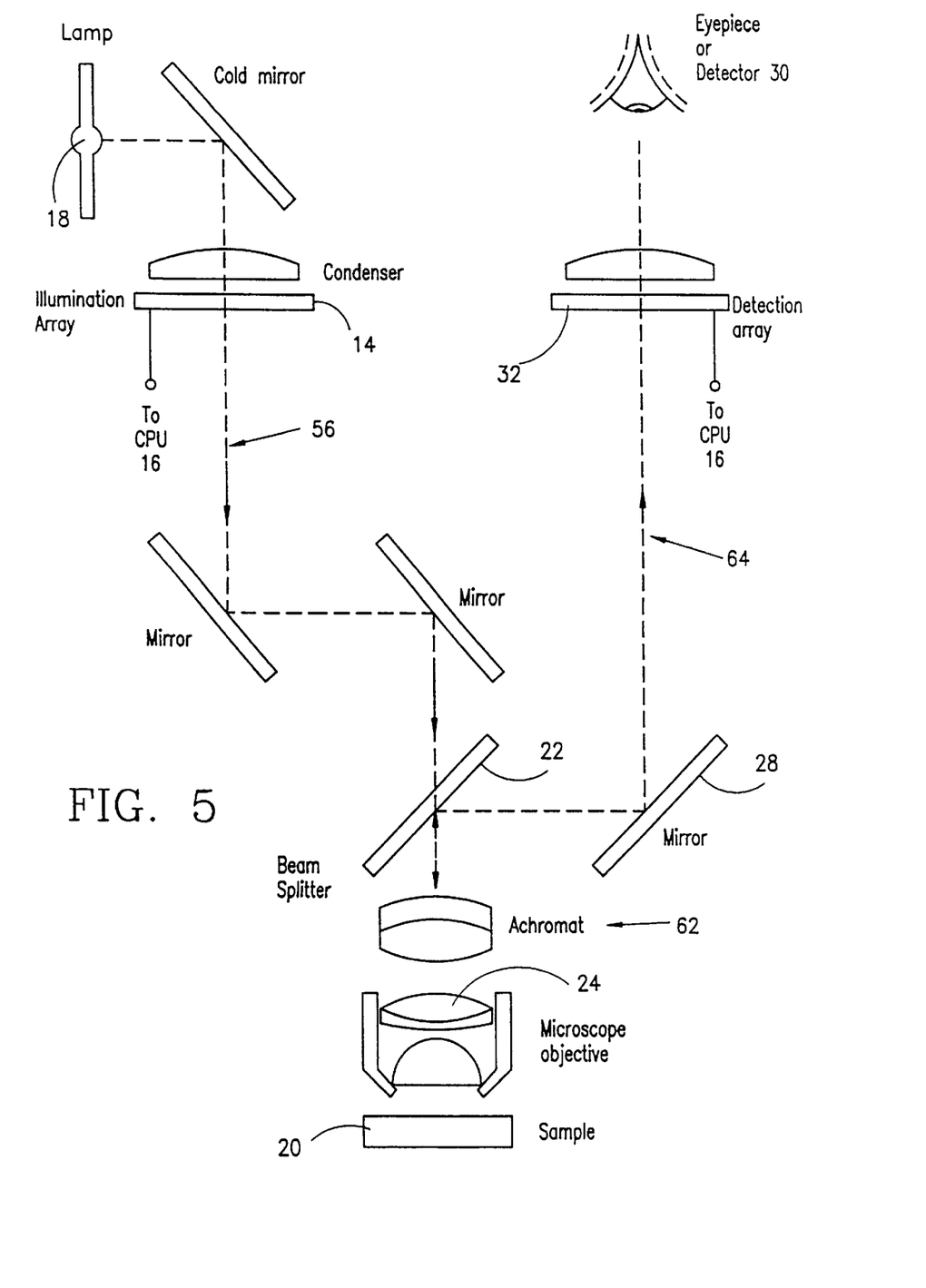
FIG. 5 is an optical diagram showing the combination of the confocal light modulation system of FIG. 1 with a research microscope.

FIG. 5 illustrates one manner in which the confocal modulation system 12 may be incorporated into the structure of a conventional research microscope 62. The multiple pattern aperture array 14 is inserted into the optical path of the illumination subsystem 56 for the microscope while the conjugate aperture pattern unit 32 is inserted into the optical path of the microscope image subsection 64. The remaining optical components shown in FIG. 5 are components of the research microscope 42.

The successful operation of a light microscope is critically dependent on its illumination system. Specimens are usually non-luminous and must therefore be observed via light transmission, reflection, or fluorescence which requires the help of an auxiliary system consisting of an illumination source, condenser, and field aperture stops. Reflection or fluorescence observations usually employ epi-illumination where the microscope objective also functions as the condenser lens. Basic control of the illumination path and profile in any of these approaches usually employs one of two methods known as critical illumination and Köhler illumination.

Critical illumination is achieved by placing the light source behind the field stop and imaging the source onto the object plane of the microscope objective. With Köhler illumination, an auxiliary lens, located behind the field stop, forms an image of the source in the back focal plane of the condenser. The object plane of the microscope objective is illuminated with superimposed collimated beams corresponding to each source point that tend to average out spatial irregularities in source brightness. For this reason, Köhler illumination is usually preferred over critical illumination. Nevertheless, Köhler illumination only approximates illumination uniformity and is not optimal for many applications.

Current microscope illumination systems have evolved primarily to concentrate light on the specimen. External devices placed along the light path can manipulate properties of the light such as wavelength, polarization, and intensity. However, these devices often serve only one purpose and lack the flexibility required when combined with other microscope modalities.

In accordance with the present invention, both reflective and transmissive confocal light modulated optical imaging systems have been developed wherein the conjugated illumination aperture and the detection aperture can be configured by double passing through a single digital micromirror device.

Figure 6:
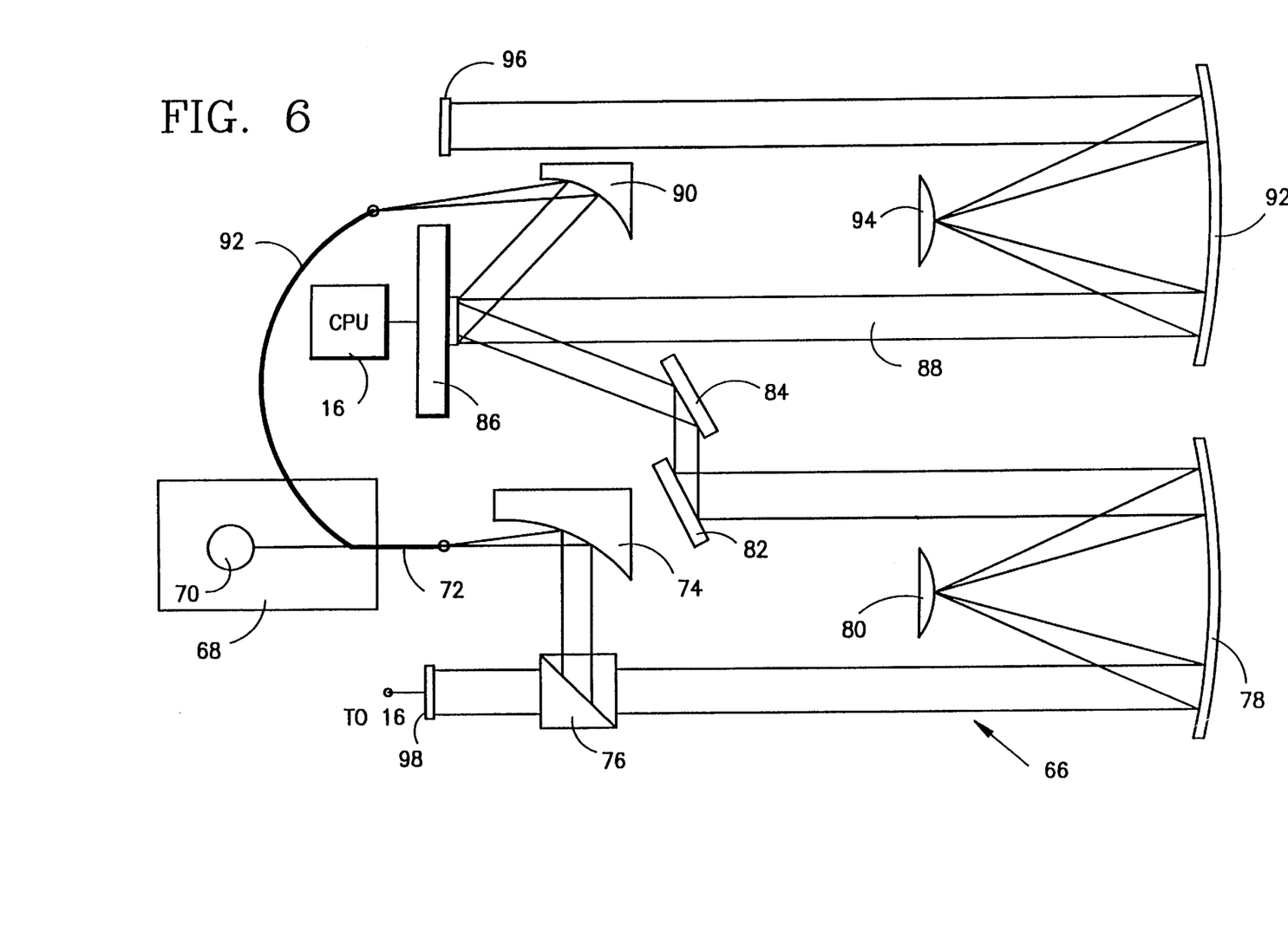
FIG. 6 is an optical diagram of a spatially light modulated optical instrument including a single digital micro-mirror device and a reflective imaging means.

FIG. 6 illustrates a confocal light modulated optical imaging system indicated generally at 66 which uses all reflective components to perform 1:1 imaging. This system has no chromatic aberration and less spherical aberration. The system 66 includes a light source module 68 containing a light source 70 and any cooling fans required (not shown). The light source module is isolated from the remainder of the light modulated optical imaging system 66 and is connected thereto by a single mode optical fiber or optical fiber coupling bundles 72 which transmit light from the light source module while isolating the system from mechanical vibrations which may be present in the light source module. For a coherent light source 70, a single mode optical fiber will be used for the coupling 72, while for an incoherent white light source, an optical fiber bundle will be used. Light from the coupling 72 is directed onto a parabolic mirror 74 and is reflected to a beam splitter 76. From the beam splitter, light is reflected to a first spherical mirror 78 and then to a second spherical mirror 80 which reflects it back to the first spherical mirror. The light is then reflected to mirrors 82 and 84 which direct light onto a computer controlled digital micro-mirror device 86 of the type previously described. Mirrors 82 and 84 are not always required for directing light to the digital mirror device 86. Without mirrors 82 and 84 light can also be directed to the digital mirror device 86 by rotating the angle of the optical system formed by the spherical mirrors 78 and 80. The device 86 can be an array of 864×756 mirrors that can be individually tilted ±10° dependent on the state of an associated binary memory cell. In one angle state a mirror will direct light down a light path 88 while in the second angle state the mirror will direct light to a parabolic mirror 90.

In multiple point confocal imaging of the type attained with the device 86, as little as 1% of the light received from the mirror 84 is directed down the light path 88 for imaging and the rest is deflected. This not only results in poor illumination efficiency, but the deflected light will cause unwanted heat in the vicinity of device 86 that would normally require the use of a cooling fan which creates unacceptable mechanical vibrations. In accordance with the present invention, the mirror 90 is provided to receive the deflected light and direct it into an optical cable or cable bundle 92 that returns this light to the coupling 72. This recycling of the unused diffracted light both raises the light efficiency of the system while reducing heat dissipation in the area of the device 86 so that no cooling fan is required.

The light pattern from the digital micro-mirror device 86 is directed along the light path 88 to a third spherical mirror 92 and is reflected thereby to a fourth spherical mirror 94. The pattern is then reflected from the spherical mirror 94 back to the spherical mirror 92 which reflects the pattern onto an image plane 96. The image plane 96 represents the image plane of a microscope objective which relays light to a specimen under observation.

The image from the specimen is directed back to the image plane 96 and passes back along the same path followed by light from the light module 68. It is reflected back by the micro-mirror device 86 and when it reaches the beam splitter 76, it is directed onto the image plane 98 of a detector such as the detector 30. By double passing a single digital micro-mirror device with both the illumination light and the pattern image from the specimens, alignment problems which can arise from the use of a separate detector mask are eliminated. Axial resolution is also improved in comparison with the axial resolution in the ideal single pinhole confocal imaging case. The micro-mirror device reflects a light image to the detector which is in a pattern corresponding to the pattern of illumination spots initially created by the micro-mirror device and rejects light outside said pattern.

Computer simulations have shown that the intensity contrast ratio of the micro-mirror device on pixel to off pixel in the range between 20 and 10,000 can improve the axial resolution in comparison with the axial resolution of the ideal single pinhole confocal imaging case.

Figure 7:
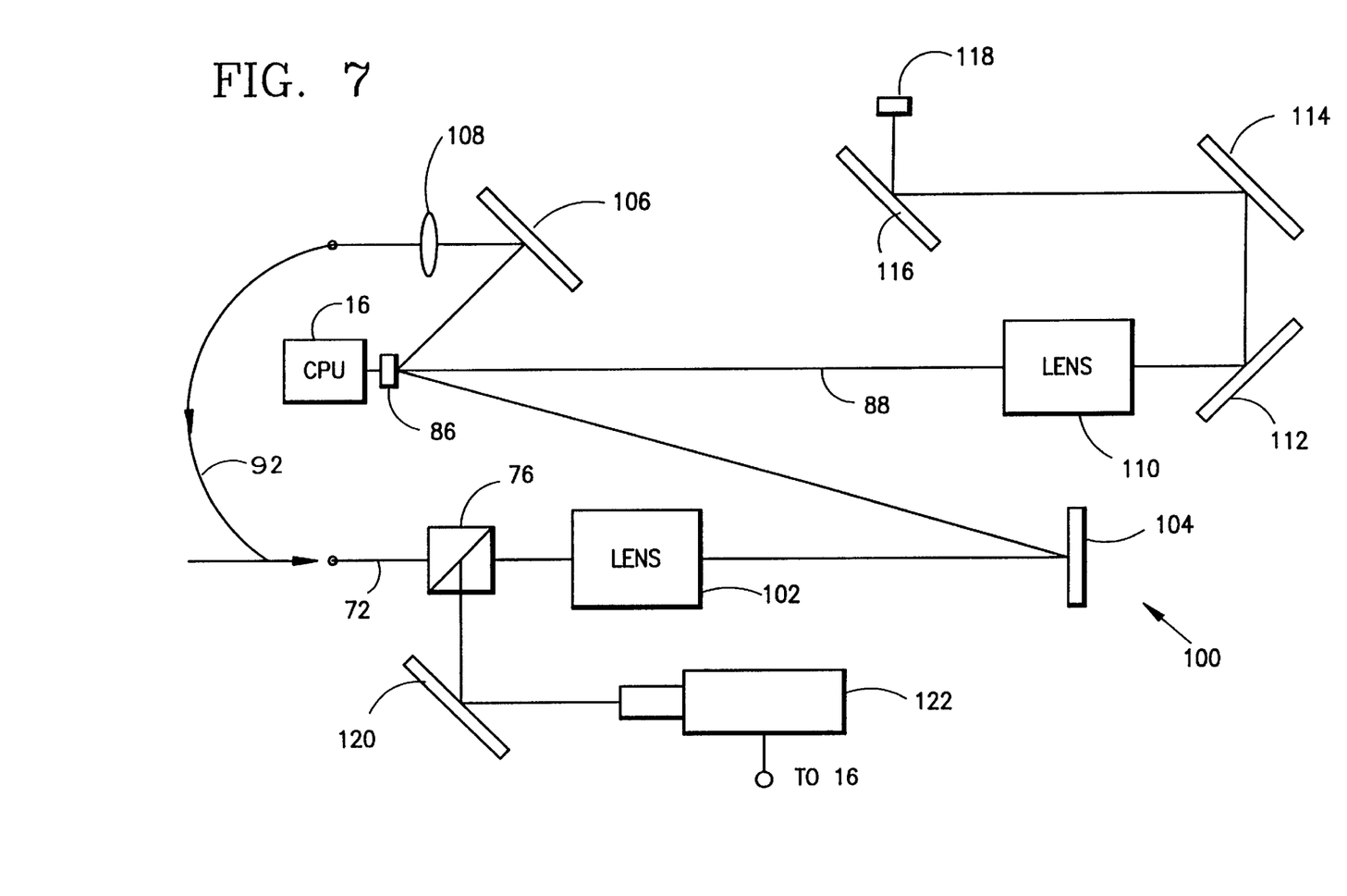
FIG. 7 is an optical diagram of a spatially light modulated optical instrument including a single digital micro-mirror device and a transmissive imaging means.

FIG. 7 illustrates a confocal light modulated optical imaging system 100 with a transmissive imaging means where components having a similar structure and operation to those shown in FIG. 6 will be identified with like reference numerals. Here a combination of lenses and mirrors illuminate the digital micro-mirror device to generate the confocal scanning image. Light from the light module 68 and diffracted light from the optical cable 92 is passed by the optical coupling 72 and the beam splitter 76 to a first lens 102 which transfers the light on a mirror 104. The mirror 104 then reflects the light onto the digital micro-mirror device 86, and the deflected light from the micro-mirror device is reflected by a mirror 106 through a lens 108 into the optical cable 92. The light pattern from the micro-mirror device is transmitted along the light path 88 and is transferred by a lens 110 on a mirror 112. The mirror 112 reflects the light pattern to a mirror 114 which in turn reflects the light pattern to a mirror 116. Mirror 116 reflects the light pattern onto a microscope image plane 118, which in the case of a transmissive confocal light modulated imaging system, is the image plane of the microscope illumination condenser on the side of the specimen which is opposite to the microscope objective. As in the case of the reflective confocal imaging module, the light pattern from the specimen passes from the image plane 118 back over the same optical path taken by the light from the light module to the beam splitter 76. The beam splitter directs this light to a mirror 120 which then reflects the light pattern onto the image plane of a detector 122.

The ability to alternate rapidly between two illumination sources extends the capabilities of conventional light microscopes. In theory, any interaction between light and matter which alters a property of the incident light can be used to generate an optical image. For example, wavelength, circular dichroism, and polarization are all properties of light that can be varied for image formation. Switching between left and right circularly polarized or linearly polarized light can be used to generate polarization difference images. The use of two fluorescent indicators, each operating in the single excitation mode, can be achieved by switching between two excitation wavelengths. With variable dwell times, the user can optimize the collection of data derived from two sources having different time scales. For example, a slowly changing pH signal could be monitored in the presence of a rapidly changing calcium signal using SNARF and Indo-1 in hypoxic brain slices.

In accordance with the present invention, a spatially localized illumination system has been developed for operation in a dual wavelength mode. In this mode, fluorescence ratio imaging will be implemented with acquisition rates independent of the illumination switching time between two system light sources. The system provides for controlled photolysis and pattern generation, rapid switching between two light sources and controlled field illumination. The system further offers the ability to maximize the signal to noise properties of ratio imaging by providing variable dwell time for the bound and free indicator compound. With this device, the total number of photons needed for a given signal to noise figure of merit can be achieved with both images used to form the ratio by compensation for differing fluorescence efficiencies with variable excitation exposure times.

Figure 8:
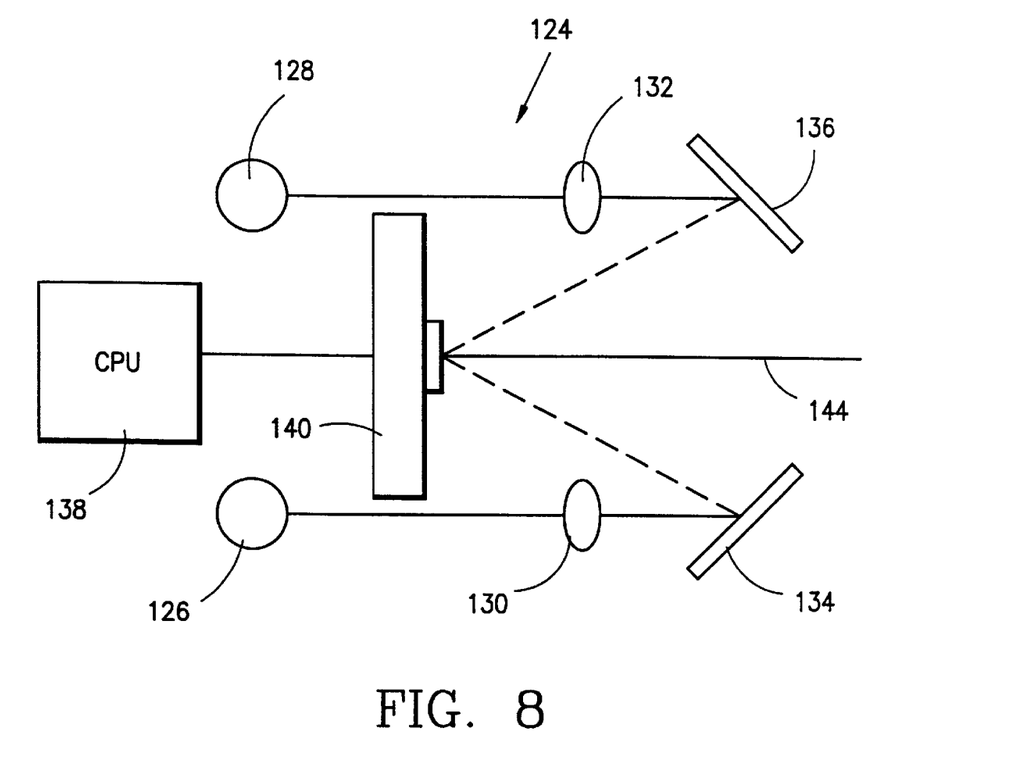
FIG. 8 is an optical diagram of a dual wavelength spatially localized illumination system.
Figure 9:
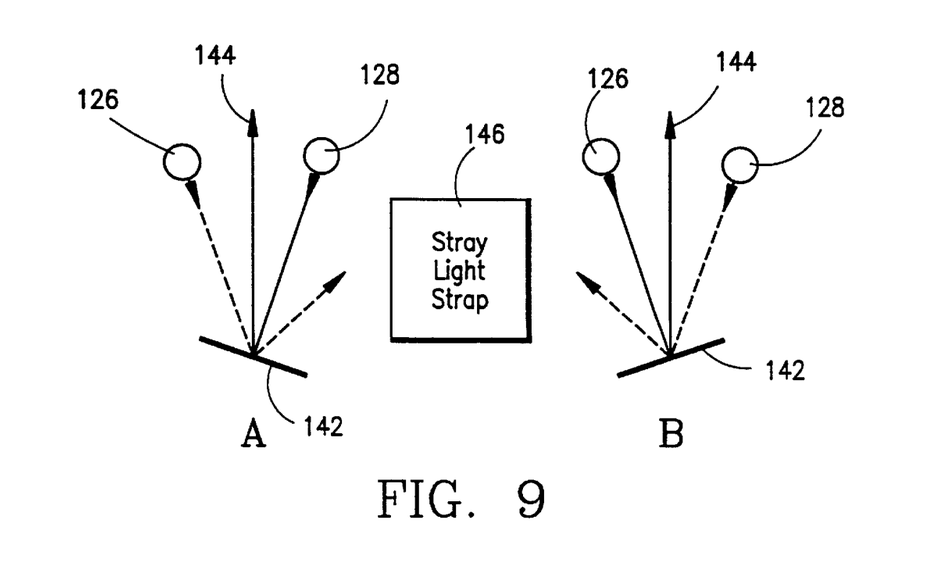
FIG. 9 is a diagram illustrating the operation of the optical instrument of FIG. 8.

Referring now to FIGS. 8 and 9, a novel microscope illumination modulation system (MIMS) indicated generally at 124 is illustrated. MIMS 124 is designed to operate in a critical illumination mode and in an alternating dual source illumination mode. In the critical illumination mode, MIMS will provide computer-controlled and spatially localized illumination of an object plane over pixels approaching the diffraction limit. For this mode, control paradigms for spatial photolysis of "caged" compounds, pattern generation for fluorescence recovery after photobleaching and photoactivation of fluorescence can be provided.

In the dual-source illumination mode, MIMS provides submillisecond switching between two light sources. Thus MIMS is a multipurpose illumination attachment that can be used in either the epi-illumination or condenser port of an optical microscope such as that shown in FIG. 5. It is also intended to be used as a light source for the confocal modulation systems shown in FIGS. 1, 4, 6 and 7.

The microscope illumination modulation system 124 includes first and second light sources 126 and 128 which provide light beams that are transferred respectively by lenses 130 and 132 and mirrors 134 and 136 onto a digital micro-mirror device 140 which is controlled by a processor 138 or other sequencing control unit. FIG. 9 illustrates the basic optical diagram for one digital micro-mirror pixel 142. In sequence A, the mirror pixel 142 is inclined ten degrees to the right to direct a light beam from the light source 126 down an optical path 144 while diverting the light beam from the light source 128 away from the optical path. This diverted beam can be picked up by a light trap 146, such as the parabolic mirror 90, which feeds light through a fiber optic cable back to the source.

In sequence B of FIG. 9, the mirror pixel 112 is inclined ten degrees to the left to direct a light beam from the light source 128 down the optical path 144 while diverting the light beam from the light source 126 away from the optical path. The lens and mirror combinations 130 and 134 and 132 and 136 are positioned and designed to direct the light beams from the light sources 126 and 128 at angles to the digital micro-mirror device 140 which enable the selected mirror pixels of the digital micro-mirror device to operate in the manner illustrated in FIG. 9. The digital micro-mirror device has an array of 864×756 mirror pixels that can be tilted plus or minus ten degrees dependent upon the zero or one state of an associated binary memory cell. The mirrors can switch between these two angle states in only 30 microseconds.

With two light sources 126 and 128 of different light wavelengths, complementary patterns of two wavelengths can be created.

When the microscope illumination modulation system 124 is used in the critical illumination mode, an image of the digital micro-mirror device will be generated in the object plane of the microscope. Using a standard computer interface, (mouse, touchpad, pen, etc.) the operator will be able to outline an area or areas on the computer display for subsequent illumination by one or more illumination sources coupled to the MIMS 124. When the external light sources are triggered, only the defined area will be illuminated. Neurotransmitters could be released from caged precursors in dendritic regions. Specific chromosomes could be targeted for ablation in chromosome surgery.

In the alternating dual-source illumination mode of the MIMS 124, the digital micro-mirror device will be used to switch between the two external light sources. The operator can use either the processor 138 to control the switching rate and duty cycle or some other external synchronization source. This control will allow optimal illumination of dual-excitation single-emission fluorescent compounds such as the calcium indicator Fura-2.

Finally, in the uniform illumination mode, Köhler illumination will be used to illuminate the surface of the digital micro-mirror device. Köhler illumination is a method of adjusting the illumination system of a microscope which offers several advantages including maximizing contrast, and lateral and axial resolution. Maximum performance is achieved by illuminating the specimens with a converging set of plane wave fronts, each arising from an image of the source in the condenser aperture and conjugate with the back focal plane of the objective. Optimum performance is only achieved when the condenser aperture is uniformly illuminated. This is difficult to achieve with concentrated arc-lamps which are highly nonuniform. Often, luminous density is sacrificed by over-filling the aperture in order to approximate uniform illumination. MIMS 124 has the ability to control the illumination of the condenser aperture using the digital micro-mirror device to create a time-varying mask. This feature will enhance the use of the microscope in any of the modes of microscopy which rely on uniform illumination to generate image contrast. These modes include phase contrast, interference contrast, differential interference contrast, modulation contrast, darkfield, absorption, reflection, polarization and fluorescence.

For some applications, it would be possible to direct selected pixels of light from both light sources 126 and 128 simultaneously down the optical path 144. To accomplish this, the mirrors 134 and 136 would direct light from a respective light source on an area of the micro-mirror device 140 which does not receive light from the remaining light source and the pixels in each area would be separately controlled by the processor 138. For dual color light projection, the light sources 126 and 128 would provide light of different colors. Other differing light characteristics could be separately provided by these two light sources and simultaneously projected.

Figure 10:
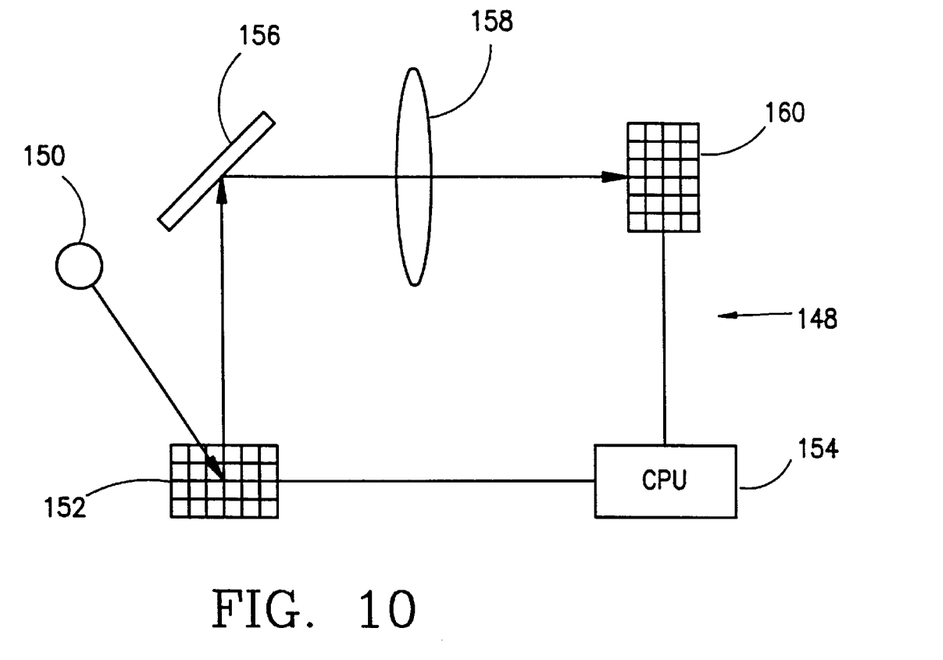
FIG. 10 is an optical diagram of a spatially light modulated optical instrument for lens aberration testing.

FIG. 10 illustrates a spatially light modulated optical lens testing instrument and method for real time lens aberration testing. In its simplest form, the lens testing instrument indicated generally at 148 includes a light source 150 which projects light on a digital micro-mirror device 152 that is controlled by a processor 154. An optical system, indicated for illustrative purposes as a mirror 156, directs light from the digital micro-mirror device 152 along an optical path through a lens 158 under test. Each pixel mirror of the digital micro-mirror device can constitute a separate beam source under the control of the processor 154, although for illustrative purposes, only two of such beams are shown in FIG. 10. Each beam passes through the test lens and contacts an optical detector 160 at a definite location. The position of each pixel beam on the detector is indicative of the condition of the test lens 158, for with a properly configured lens, each beam will contact the detector at a defined contact point programmed in the processor 154. Deviation of the beam from this defined contact point indicated aberration in the lens in the area through which the beam passes, and detector position data indicative of this deviation is fed to the processor 154 where it is compared with the stored position data to obtain deviation data values. These deviation data values can be used in a printout or display to indicate where and to what degree lens correction is required or can be directed as control data for a lens grinder or other lens formation device to directly control correction of the test lens 158.

Obviously, in practice the lens testing instrument can include optical components in addition to those shown diagrammatically in FIG. 10. For example, a reflective lens test system can employ the complete confocal light modulated optical system 66 of FIG. 6 with the exception that the lens 158 under test would be placed in the position of the image plane 96 and a mirror 162, shown in broken lines in FIG. 6 would be placed behind the lens 158 to reflect the pixel beams back to the spherical mirror 92 and back along the light path to the image plane 98 of the detector 160.

Figure 11:
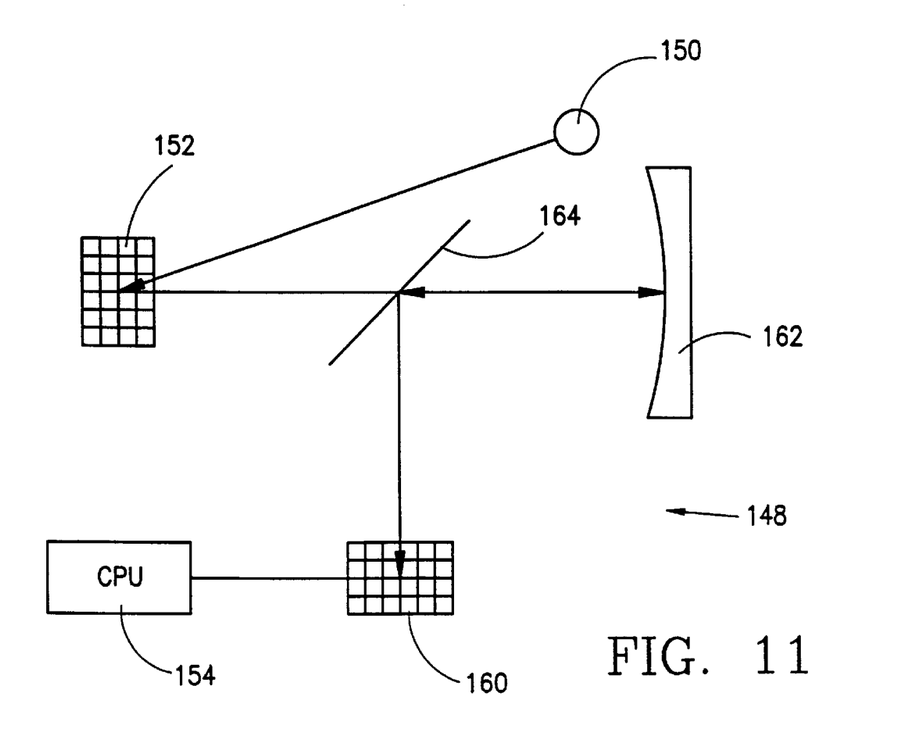
FIG. 11 is an optical diagram of a spatially light modulated optical instrument for mirror aberration testing.

As shown in FIG. 11, optical components other than lenses can be tested using a testing instrument similar to that of FIG. 10. Here the testing instrument 148 is used to test a mirror 162 rather than a lens, and employs a beam splitter 164 to direct light reflected from the test mirror to the optical detector 160. Thus, the optical component test system 148 uses each pixel in a spatial light modulator (e.g., micromirror device 152) to generate a real-time ray tracing. The ray tracings pass through a test lens or are reflected by a test mirror and finally reach a two-dimensional detector 160 (e.g., CID or CCD) which is conjugated to the spatial light modulator plane in object-image relation. The position and the distribution of the ray tracings on the detector plane indicate the aberration situation of the test optical component. The signal processing means implemented in central processor unit (CPU) 154 retrieves the structural information of the test optical component after it collects the position and the distribution of the ray tracings on the detector plane.

At the present time, almost all of the commercial confocal microscope systems have very low photon signals, e.g., from 20 to 100 photons. Such a low number of photons has a very small signal-to-noise ratio (SNR) because of quantum noise. A way to improve the SNR of a confocal image can comprise the following steps. In the first step, use a large illumination aperture and a large detection aperture to get a confocal image which has a high SNR and low axial resolution. In the second step, use another different large illumination aperture and a large detection aperture to get another confocal image which has a high SNR and low axial resolution. In the third step, use the difference of said confocal images to get the final confocal image which has both high SNR and high axial resolution.

In microscopic imaging, different imaging modes, e.g., confocal scanning imaging mode, wide-field fluorescence imaging mode, bright field imaging mode, dark field imaging mode, contrast (phase contrast, modulation contrast, interference contrast, and polarization contrast) imaging modes, will get different information. To spatially correlate the information from different imaging is very helpful for analyzing a sample.

By using discrete and digital illumination and discrete and digital detection, we can easily realize such correlation. The system comprises the following elements and relationships; namely, a group of discrete, analog or digital detection elements sampling the detection plane, an object plane, which samples a slice of sample, substantially conjugating with both said illumination plane and said detection plane in object-image relationships, a set of complimentary confocal patterns formed by said illumination elements and said detection elements generating a confocal imaging mode. By setting all said illumination elements at the same time to the same level or different levels, e.g., turning on all DMD pixels at the same time, the illumination plane becomes a uniform reflection plane, or a uniform transmission plane, thus switching to other imaging modes. Said spatial correlation is realized by a signal processing means which correlates the signals from each detection element at the same address in different imaging modes.

INDUSTRIAL APPLICABILITY

The spatially light modulated confocal optical instruments and method of the present invention provides conjugate aperture image formation to counter the deficiencies of known devices such as scanning confocal microscopes. The confocal light modulation system may be used to convert a conventional research microscope into a confocal microscope having enhanced capabilities. Since the unit has no moving parts and is vibration free, it is suitable for sensitive micro-manipulation and intracellular recording techniques common in neurophysiological studies. The high speed imaging capability of the unit renders it suitable for use to follow dendritic and synaptic changes in neurons on the millisecond scale or to measure kinetics in response to drugs or fluorescent indicators for intracellular pH, calcium, sodium, etc. The spatially light modulated confocal optical instrument is particularly well adapted for use in the high speed inspection of silicon wafers for quality control purposes in integrated circuit production, and for testing high quality lenses.

We claim:

1. A confocal optical imaging system for imaging a specimen comprising:

a light source for providing light to the specimen, optical means to direct light from said light source along an optical path to said specimen, pattern array means positioned in said optical path between said light source and said specimen which operates to transform light from said light source into a plurality of simultaneously formed illumination spots arranged in a pattern and to block light outside said pattern, said optical means operating to image said pattern of illumination spots simultaneously on said specimen, image detector means, said optical means operating to direct light from said pattern of illumination spots on said specimen back along said optical path to said image detector means, said pattern array means operating to mask said image detector means to cause said image detector means to receive a light image in a pattern corresponding to the pattern of illumination spots and to reject light outside said pattern.

2. The confocal optical imaging system of claim 1 wherein said pattern array means is operative in response to control signals to provide sequential patterns of illumination spots, and a control means is provided which is connected to said pattern array means, said control means operating to provide control signals to said pattern array means to cause said pattern array means to provide sequential complimentary patterns of illumination spots.

3. The confocal optical imaging system of claim 2 wherein said pattern array means includes a digital mirror device having a mirror coated shutter array.

4. The confocal optical imaging system of claim 3 wherein said image detector means provides image output signals from each pattern of light received by said image detector means, said control means including storage means to receive and store said image output signals.

5. The confocal optical imaging system of claim 4 which includes image processing means, said image detector means operating to provide image output signals from each pattern of light received by said image detector means to said image processing means, said image processing means operating to store said image output signals from sequential patterns of illumination spots and to subsequently combine a plurality of said stored image output signals to form a complete image frame.

6. The confocal optical imaging system of claim 5 wherein said image detector means includes a charge coupled detector device.

7. The confocal optical imaging system of claim 1 which includes light collector means mounted to receive light blocked by said pattern array means and light transmission means to transmit light from said light collector means to said light source.

8. The confocal optical imaging system of claim 7 wherein said light source includes a light generator and a flexible fiber optic light conductor for conducting light from said light generator to said optical means.

9. A confocal optical imaging system for imaging a specimen comprising:

a light source for providing light to the specimen, optical means to direct light from said light source along an illumination path to said specimen, pattern array means positioned in said illumination path between said light source and said specimen, said pattern array means operating to transform light from said light source into a plurality of simultaneously formed illumination spots arranged in a pattern and to deflect light outside said pattern, said optical means imaging said pattern of illumination spots simultaneously on said specimen, light collector means mounted to receive light deflected by said pattern array means and light transmission means to transmit light from said light collector means to said light source.

10. The confocal optical imaging system of claim 9 wherein said light source includes a light generator and a flexible fiber optic light conductor for conducting light from said light generator to said optical means.

11. The confocal optical imaging system of claim 10 wherein said pattern array means is operative in response to control signals to provide sequential patterns of illumination spots, and a control means is provided which is connected to said pattern array means, said control means operating to provide control signals to said pattern array means to cause said pattern array means to provide sequential complimentary patterns of illumination spots.

12. The confocal optical imaging system of claim 10 wherein said pattern array means includes a digital mirror device having a mirror coated shutter array.

13. A confocal optical imaging system for imaging a specimen comprising:

a light source for providing light to the specimen, optical means to direct light from said light source along an optical path to said specimen, said optical means including a first optical assembly including at least one optical element and a second optical assembly including at least one optical element, a single pattern array means positioned between said first and second optical assemblies in the optical path between said light source and said specimen which operates to transform light from said light source into a plurality of simultaneously formed illumination spots arranged in a pattern and to deflect light outside said pattern, said optical means operating by means of said second optical assembly to image said pattern of illumination spots simultaneously on said specimen, said pattern array means operating in response to control signals to provide sequential patterns of illumination spots, and control means connected to said pattern array means, said control means operating to provide control signals to said pattern array means to cause said pattern array means to provide sequential complimentary patterns of illumination spots.

14. The confocal optical imaging system of claim 13 which includes a light collector assembly mounted to receive light deflected by said pattern array means, and light transmission means to transmit light from said light collector assembly to said light source.

15. The confocal optical imaging system of claim 13 wherein said light source includes a light generator and a flexible optical light conductor for conducting light from said light generator to said first optical assembly.

16. The confocal optical imaging system of claim 13 which includes image detector means, said optical means operating to receive and direct light from said pattern of illumination spots on said specimen back along said optical path to said pattern array means and image detector means, said pattern array means operating to provide a light image in a pattern corresponding to the pattern of illumination spots and to reject light outside said pattern, said optical means operating by means of said first optical assembly to direct said light image to said image detector means.

17. The confocal optical imaging system of claim 16 wherein said first optical assembly includes beam splitter means which operates to receive light from said light source and to transmit said light along said optical path toward said pattern array means and to receive the light image in a pattern corresponding to the pattern of illumination spots from said pattern array means and to direct the light image to said image detector means.

18. The confocal optical imaging system of claim 17 wherein said pattern array means is a digital mirror device having a mirror coated shutter array.

19. The confocal optical imaging system of claim 18 which includes image processing means, said image detector means operating to provide image output signals from each pattern of light received by said image detector means to said image processing means, said image processing means operating to store said image output signals from sequential patterns of illumination spots and to subsequently combine a plurality of said stored image output signals to form a complete image frame.

* * * * *

UNITED STATES PATENT AND TRADEMARK OFFICE
CERTIFICATE OF CORRECTION

PATENT NO. : 5,923,466
DATED : July 13, 1999
INVENTOR(S) : Andrew KRAUSE

It is certified that error appears in the above-identified patent and that said Letters Patent is hereby corrected as shown below:

On the title page,
under, "Related U.S. Application Data", change "Continuation-in-part of application No. 08/138,067, Oct. 20, 1991, Pat. No. 5,587,832" to --Continuation-in-part of application No. 08/138,067, Oct 20, 1993, Pat. No. 5,587,832--.

Signed and Sealed this

Fifth Day of September, 2000

Attest:

Q. TODD DICKINSON

*Attesting Officer*　　　　　*Director of Patents and Trademarks*